US012670619B2

(12) United States Patent
Rosell

(10) Patent No.: US 12,670,619 B2
(45) Date of Patent: Jun. 30, 2026

(54) EYE TRACKING

(71) Applicant: TOBII AB, Danderyd (SE)

(72) Inventor: Mikael Rosell, Danderyd (SE)

(73) Assignee: Tobii AB, Danderyd (SE)

( * ) Notice: Subject to any disclaimer, the term of this patent is extended or adjusted under 35 U.S.C. 154(b) by 273 days.

(21) Appl. No.: 18/380,786

(22) Filed: Oct. 17, 2023

(65) Prior Publication Data

US 2024/0153136 A1 May 9, 2024

(30) Foreign Application Priority Data

Oct. 24, 2022 (SE) ..................................... 2251233-9

(51) Int. Cl.
| | |
|---|---|
| *G06T 7/73* | (2017.01) |
| *G06T 7/64* | (2017.01) |
| *G06V 10/44* | (2022.01) |
| *G06V 10/75* | (2022.01) |
| *G06V 40/18* | (2022.01) |

(52) U.S. Cl.
CPC .................. *G06T 7/74* (2017.01); *G06T 7/64* (2017.01); *G06V 10/44* (2022.01); *G06V 10/751* (2022.01); *G06V 40/193* (2022.01); *G06V 40/197* (2022.01); *G06T 2207/30196* (2013.01)

(58) Field of Classification Search
CPC . G06T 2207/30196; G06T 7/74; G06V 10/44; G06V 10/751; G06V 40/193; G06V 40/197; G06F 3/013
See application file for complete search history.

(56) References Cited

U.S. PATENT DOCUMENTS

| | | | |
|---|---|---|---|
| 6,419,638 B1 * | 7/2002 | Hay ......................... | A61B 3/11 |
| | | | 600/558 |
| 9,149,179 B2 | 10/2015 | Barnard et al. | |
| 11,181,740 B1 | 11/2021 | Lewis | |
| 2017/0344854 A1 * | 11/2017 | Behringer .............. | G06N 20/00 |
| 2018/0314325 A1 | 11/2018 | Gibson et al. | |
| 2019/0073533 A1 * | 3/2019 | Chen .................... | G06V 40/197 |
| 2020/0183490 A1 * | 6/2020 | Klingström ............ | A61B 3/113 |
| 2021/0350554 A1 * | 11/2021 | Masko .................... | G06T 7/248 |
| 2022/0230749 A1 * | 7/2022 | Lanchulev ............. | G16H 40/63 |

FOREIGN PATENT DOCUMENTS

| | | | |
|---|---|---|---|
| CN | 107705786 A | | 2/2018 |
| CN | 109188298 A | | 1/2019 |
| JP | 2009166783 A | * | 7/2009 |
| JP | 2020014611 A | | 1/2020 |
| KR | 20190027354 A | | 3/2019 |
| KR | 102375562 B1 | | 3/2022 |

OTHER PUBLICATIONS

Swedish search report for Appl. Nr SE2251233-9, completed on Apr. 13, 2023.

* cited by examiner

*Primary Examiner* — Gregory A Morse
*Assistant Examiner* — Stefano Anthony Dardano
(74) *Attorney, Agent, or Firm* — Christopher Ignatius Moylan

(57) ABSTRACT

A method of determining a presence of a tear in an eye of a user of an eye tracking system, the method comprising receiving an image of the eye of the user, processing the image to identify one or more features of the image, comparing the one or more identified features to one or more expected features, and determining that a tear is present in the eye of the user if the one or more identified features differs from the one or more expected features by at least a threshold amount.

11 Claims, 6 Drawing Sheets

100

210

220

230

200a

240

210

220

230

200b

250

240

200c

200d

<u>300</u>

310 — Illuminate an eye of a user

320 — Capture an image of the eye

330 — Receive the image of the eye

340 — Process the image to identify features of the image

350 — Compare identified features to expected features

360 — Is a tear present in the eye

NO

YES

370 — Take an associated action

380 — Perform eye tracking

<u>400</u>

EYE TRACKING

TECHNICAL FIELD

This disclosure generally relates to the field of eye tracking. In particular, the disclosure relates to determining the presence of a tear in the eye of a user of an eye tracking system.

BACKGROUND

In eye tracking applications, images of the eyes of a user are retrieved and analysed in order to estimate a gaze direction of the user. There are different methods for achieving such an estimation. In some methods, ambient light is used when capturing images of the eyes of the user, while in some methods additional light sources are used to illuminate the eyes for retrieving images of the eyes of the user. Generally, the estimation of the gaze is based on identification of the pupils of the eyes of the user together with identification of glints (corneal reflections) in the eyes. In order to identify a pupil in an image of the eye, the contrast between a representation of the pupil and a representation of an iris of the eye in the image may be sufficient.

One known method of eye tracking includes the use of infrared light and an image sensor. The infrared light is directed towards an eye of a user and the reflection of the light is captured by an image sensor. Through analysis of the reflection point, the direction of the user's gaze may be calculated. Portable or wearable eye tracking devices using illuminators and image sensors for determining gaze direction have also been previously described.

However, problems can arise in eye tracking applications when a tear is formed in the eye of a user. The rounded shape of the tear reflects light in a different way to the cornea of the eye, while the water in the tear refracts light, further changing its direction. This may result in a situation where the position of the pupil or glints in the eye cannot be accurately identified. In such situations, it is difficult to determine a gaze direction with the desired accuracy and reliability.

SUMMARY

This disclosure attempts to solve the problems noted above by determining if a tear is present in the eye of a user. In an image of an eye without tears, the cornea normally reflects glints that are in a certain pattern depending on the spatial arrangement of illuminators of an eye tracking system. If a tear is present, the light will be refracted such that the shape of the glint pattern and the pupil will change. Therefore, the shape of the detected glints and the pupil can be analysed to detect if a tear is present.

Once a tear is detected, an appropriate action can be taken. For example, an alert that a tear is present in the eye or a confidence value for an output of the eye tracking system based on the presence of the tear can be provided to a user. In other examples, an eye tracking algorithm can be altered to take account of the tear, for example by removing the tear from consideration by the algorithm or by altering the algorithm itself.

According to an aspect, there is provided a method of determining a presence of a tear in an eye of a user of an eye tracking system, the method comprising receiving an image of the eye of the user, processing the image to identify one or more features of the image, comparing the one or more identified features to one or more expected features, and determining that a tear is present in the eye of the user based on the comparison.

Optionally, the one or more features of the image comprises an edge of the pupil or iris of the eye of the user. Optionally, the method comprises processing the image to determine a circularity of the edge of the pupil or iris, comparing the determined circularity to an expected circularity of the edge of the pupil or iris, and determining that a tear is present in the eye of the user if a difference between the determined circularity and the expected circularity is above a threshold.

Optionally, the one or more features of the image comprises a glint pattern comprising one or more glints, the method comprising processing the image to determine a position of at least one glint of the glint pattern, determining a distance between the determined position of at least one glint and an expected position of the at least one glint, and determining that a tear is present in the eye of the user if the determined distance is above a threshold.

Optionally, the method comprises providing the image to an image recognition algorithm, wherein the image recognition algorithm is trained to identify images of eyes with a tear present.

Optionally, the method further comprises at least one of generating an alert that a tear is present in the eye of the user, generating a confidence value for an output of the eye tracking system based on the presence of the tear, and altering an eye tracking algorithm to take account of the tear.

According to another aspect, there is provided a computer-readable medium having stored thereon instructions that, when executed by one or more processors cause the processor to execute the method steps.

According to another aspect, there is provided an eye tracking system for determining a presence of a tear in an eye of a user, the system comprising an image sensor configured to capture an image of the eye of the user, and an image processing module configured to process the captured image to identify one or more features of the image, compare the one or more identified features to one or more expected features, and determine that a tear is present in the eye of the user based on the comparison.

Optionally, the one or more features of the image comprises an edge of the pupil or iris of the eye of the user. Optionally, the image processing module is configured to process the captured image to determine a circularity of the edge of the pupil or iris, compare the determined circularity to an expected circularity of the edge of the pupil or iris, and determine that a tear is present in the eye of the user if a difference between the determined circularity and the expected circularity is above a threshold.

Optionally, the one or more features of the image comprises a glint pattern comprising one or more glints, wherein the image processing module is configured to process the captured image to determine a position of at least one glint of the glint pattern, determine a distance between the determined position of at least one glint and an expected position of the at least one glint, and determine that a tear is present in the eye of the user if the determined distance is above a threshold.

Optionally, the image processing module is configured to provide the captured image to an image recognition algorithm, wherein the image recognition algorithm is trained to identify images of eyes with a tear present.

Optionally, the image processing module is configured to perform at least one of generating an alert that a tear is present in the eye of the user, generating a confidence value for an output of the eye tracking system based on the presence of the tear, and altering an eye tracking algorithm to take account of the tear.

Optionally, the eye tracking system further comprises at least one illuminator configured to illuminate eye of the user of the eye tracking system, wherein the illuminator is arranged at a fixed position relative to the image sensor and/or the eye of the user.

According to another aspect, there is provided a head-mountable device comprising at least one illuminator configured to illuminate an eye of the user, an image sensor configured to capture an image of the eye of the user, and an image processing module configured to process the captured image to identify one or more features of the image, compare the one or more identified features to one or more expected features, and determine that a tear is present in the eye of the user based on the comparison.

According to another aspect, there is provided a method of determining a presence of a tear in an eye of a user of an eye tracking system, the method comprising capturing an image of the eye using an image sensor of the eye tracking system, at an image processing module of the eye tracking system processing the image to identify one or more features of the image, comparing the one or more identified features to one or more expected features, and determining that a tear is present in the eye of the user based on the comparison.

Optionally, the one or more features of the image comprises an edge of the pupil or iris of the eye of the user. Optionally, the method comprises processing the image to determine a circularity of the edge of the pupil or iris, comparing the determined circularity to an expected circularity of the edge of the pupil or iris, and determining that a tear is present in the eye of the user if a difference between the determined circularity and the expected circularity is above a threshold.

Optionally, the one or more features of the image comprises a glint pattern comprising one or more glints, the method comprising processing the image to determine a position of at least one glint of the glint pattern, determining a distance between the determined position of at least one glint and an expected position of the at least one glint, and determining that a tear is present in the eye of the user if the determined distance is above a threshold.

Optionally, the method comprises providing the image to an image recognition algorithm, wherein the image recognition algorithm is trained to identify images of eyes with a tear present.

Optionally, the method further comprises, at the image processing module, at least one of generating an alert that a tear is present in the eye of the user, generating a confidence value for an output of the eye tracking system based on the presence of the tear, and altering an eye tracking algorithm to take account of the tear.

Optionally, the method further comprises illuminating the eye of the user using at least one of ambient light, and at least one illuminator of the eye tracking system that is arranged at a fixed position relative to the image sensor and/or the eye of the user.

BRIEF DESCRIPTION OF THE DRAWINGS

Exemplary embodiments of the disclosure shall now be described with reference to the drawings in which.

Throughout the description and the drawings, like reference numerals refer to like parts.

DETAILED DESCRIPTION

Figure 1:
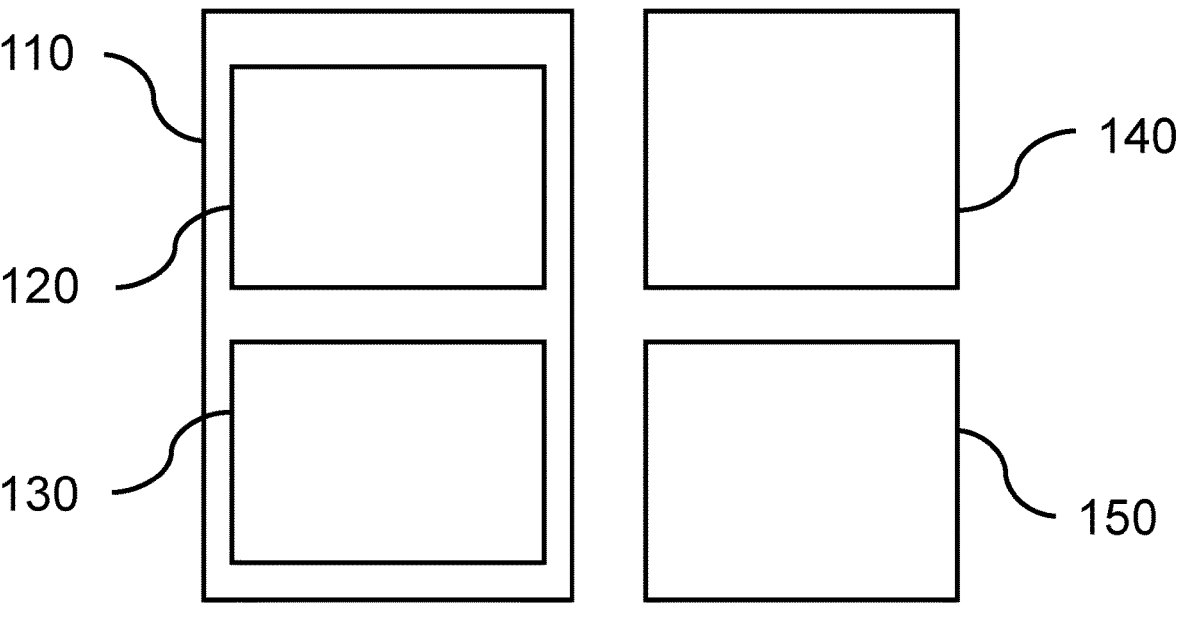
FIG. 1 is a schematic overview of an eye tracking system.
Figure 1:
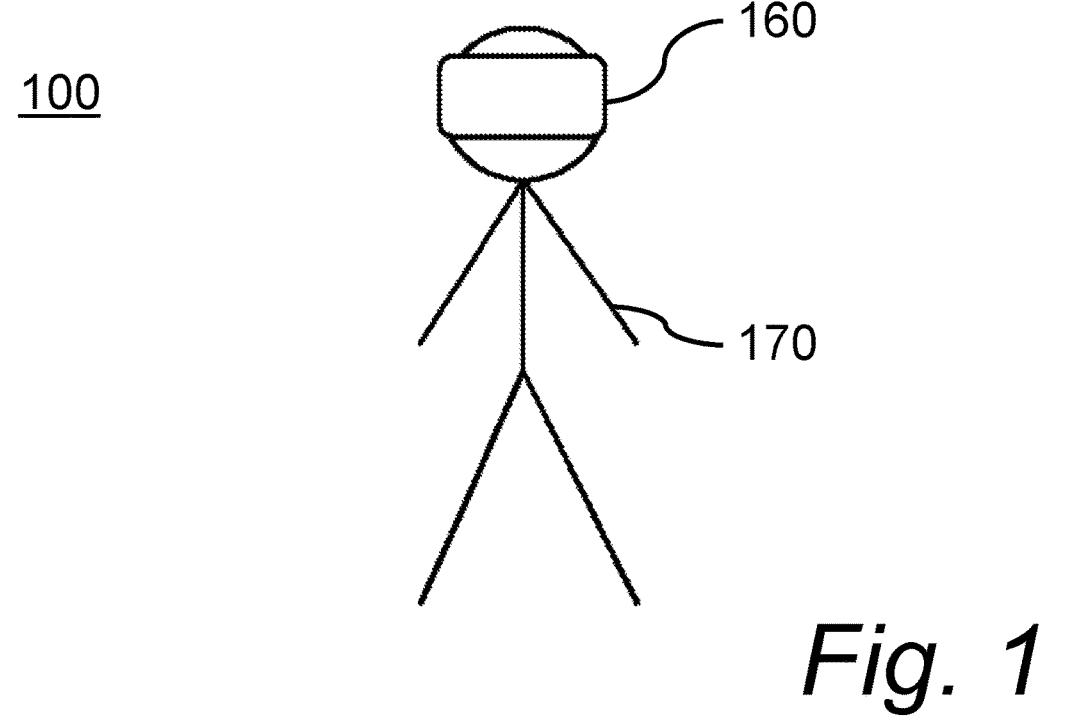

FIG. 1 is a schematic overview of an eye tracking system 100, according to one or more embodiments. The system 100 comprises eye-tracking equipment 110, comprising one or more illuminators 120 and one or more image sensors 130, a display 140, and an image processing module 150. The eye tracking equipment 110 and/or display 140 may be comprised in a head-mountable device 160 to be worn by a user 170. The eye tracking equipment 110 may be communicatively connected to the display 140 and the image processing module 150, for example via a suitable wired or wireless connection.

The one or more illuminators 120 are configured to illuminate an eye of the user 170. The illuminators 120 may be, for example, infrared or near infrared illuminators, for example in the form of light emitting diodes (LEDs). However, other types of illuminators may also be envisaged. The one or more illuminators 120 may be part of a remote tracking system, where the illuminators 120, a corresponding image sensor 130 and the display 140 are at a fixed position relative to which the user 170 may move. This may be a workstation, gaming station or the like. In another example, the illuminators 120 may be part of a wearable (e.g., head-mountable) system 160, where the illuminators 120, corresponding image sensor(s) 130 and the display 140 are at a fixed position relative to the eye of the user 170. This may be a virtual reality (VR) device such as VR glasses, an augmented reality (AR) device such as AR glasses, or the like.

The one or more image sensors 130 are configured to capture images of the eye while the user 170 looks/gazes at the display 140. The image sensors 130 may be, for example, charged-coupled device (CCD) cameras or complementary metal oxide semiconductor (CMOS) cameras. The image sensor 130 may consist of an integrated circuit containing an array of pixel sensors, each pixel sensor containing a photodetector and an active amplifier. The image sensor 130 is capable of converting light into digital signals. As an example, it could be an infrared (IR) image sensor or IR image sensor, an RGB sensor, an RGBW sensor, or an RGB or RGBW sensor with an IR filter. However, other types of image sensor may also be envisaged.

It will be appreciated that the eye tracking equipment 110 disclosed above is merely by way of example, and the system may comprise or any other suitable eye tracking equipment 110 known in the art. The image sensor 130 may be at a fixed position relative to the one or more illuminators 120 and the display 140. In some embodiments, the image sensor 130 may be at a fixed position relative to the eye of the user 170. Separate eye tracking equipment 110 (such as illuminators 120 and image sensors 130) may be employed for the left and right eyes of the user 170.

The display 140 may be a liquid-crystal display (LCD) or an LED display. However, other types of displays may also be envisaged. The display 140 may be flat or curved. The display 140 may be placed in front of one of the user's eyes. Separate displays 140 may be employed for the left and right eyes of the user 170.

Figure 4:
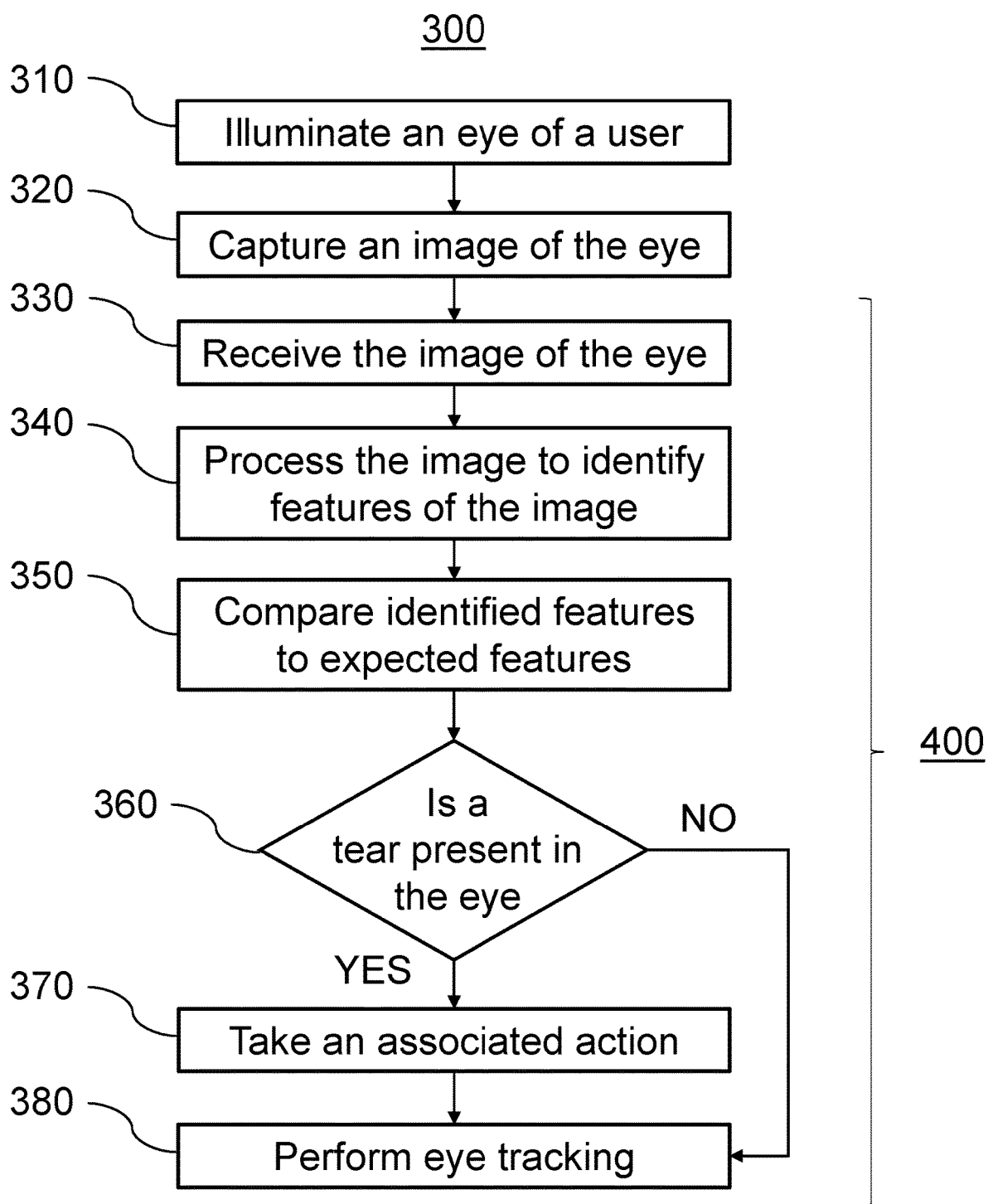
FIG. 4 is a flow chart illustrating a method for determining a presence of a tear in an eye of a user.

The image processing module 150 is configured to perform eye tracking to estimate a position of a part of an eye of the user 170, and/or a gaze of the user 170 in terms of a gaze vector, a gaze direction and/or a gaze point on the display the user 170 is viewing. The image processing module 150 may be employed for eye tracking for both eyes, or there may be separate processing circuitry for the left and right eyes. The system 100 may perform eye tracking to estimate a position of a part of an eye and/or a gaze of the user 170 for the left and right eyes separately. In one or more embodiments, the image processing module 150 may be configured to perform any or all of the method steps 330 to 380 described in connection with FIG. 4, shown collectively as method 400.

The image processing module 150 may comprise one or more processors. The processor(s) may be application-specific integrated circuits (ASIC) configured to perform a specific eye tracking and position determination method. Alternatively, the processor(s) may be configured to execute instructions (for example in the form of a computer program) stored in one or more memories. Such a memory may be comprised in the system 100, or may be external to (for example located remotely from) the system 100. The memory may store instructions for causing the system 100 to perform the method steps 330 to 380 described in connection with FIG. 4, shown collectively as method 400.

Figure 2:
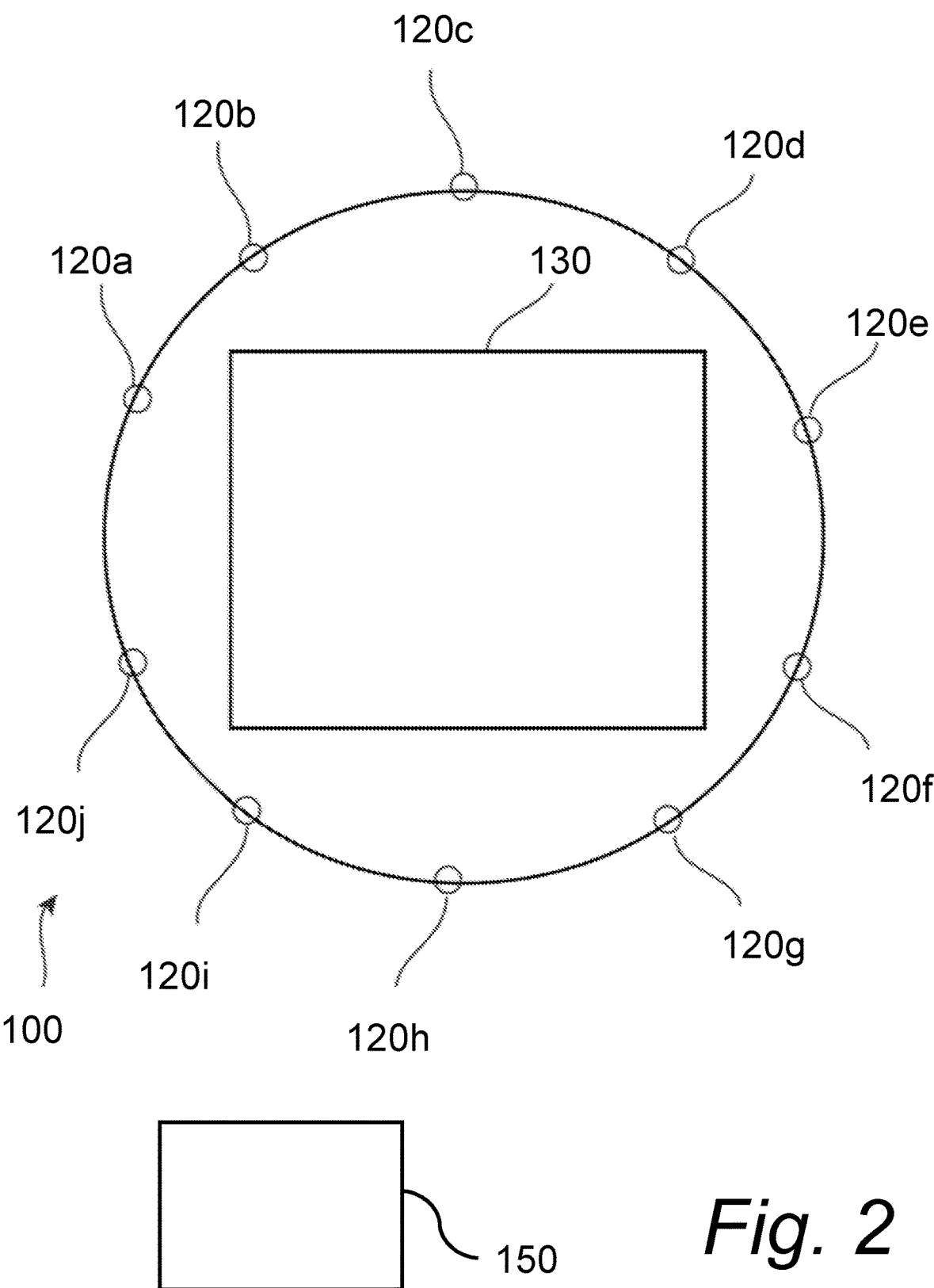
FIG. 2 is a schematic overview of an eye tracking system implemented in a head mountable device.

The system 100 according to any embodiment presented herein may be incorporated in, or communicatively connected to, the head-mountable device 160. FIG. 2 shows a simplified schematic view of an eye tracking system 100 implemented in a head mountable device 160, for example in the form of a VR device or VR headset. The system 100 comprises illuminators 120a-j for illuminating the eyes of a user 170, and an image sensor 130 for capturing images of the eyes of the user 170.

The eye tracking system 100 described with reference to FIG. 2 also comprises an image processing module 150 for receiving and processing the images captured by the image sensor 130. The image processing module 150 may be connected to the illuminators 120a-j and the image sensor 130 via a wired or a wireless connection. The image processing module 150 may be co-located with the illuminators 120a-j and the image sensor 130 or located at a distance, e.g., in a different device. In another example, the processing circuitry of the image processing module 150 may be provided in one or more stacked layers below the light sensitive surface of the image sensor 130.

In the eye tracking system 100 described with reference to FIG. 2, the illuminators 120a-j are arranged along the circumference of a circle. This will provide a generally circular pattern of glints reflected from the eye of the user 170. Capturing an image of this glint pattern allows a position of the eye to be determined. For example, to determine the position of the eye, a glint mapping is determined (describing to which illuminator each glint corresponds) and is used with the three-dimensional positions of the illuminators 120 and a camera model to determine the position of the eye in three dimensions.

This arrangement serves only as an example. It will be appreciated that any suitable number of illuminators 120 and image sensors 130 may be employed for eye tracking, and that such illuminators 120 and image sensors 130 may be distributed in different ways relative to a display 140 viewed by the user 170.

It is also to be noted that the location of the image sensor 130 in FIG. 2 is only for illustrative purposes. The location of the image sensor 130 for one eye in a VR device 160 is generally away from the line of sight for the user 170 in order not to obscure a display arranged in the VR device 160 for that eye. This is enabled for example by means of so-called hot mirrors that reflects a portion of the light and allows the rest of the light to pass. In one example, infrared light is reflected and visible light is allowed to pass.

It will be appreciated that the systems 100 described above with reference to FIGS. 1 and 2 are provided as an example, and that many other system implementations may be envisaged. For example, the system 100 may consist only of the image processing module 150. The display 140 may be comprised in the system 100, or may be regarded as separate from the system 100. The image processing modules 150 of the systems 100 in FIGS. 1 and 2 typically employ an eye model. This eye model may be calibrated to properties of the individual user's eyes.

FIGS. 3a to 3d show example images 200a-d of an eye 210. The images 200a-d may be images of an eye 210 of the user 170 captured by the image sensor 130 of the eye tracking system 100.

Figure 3A:
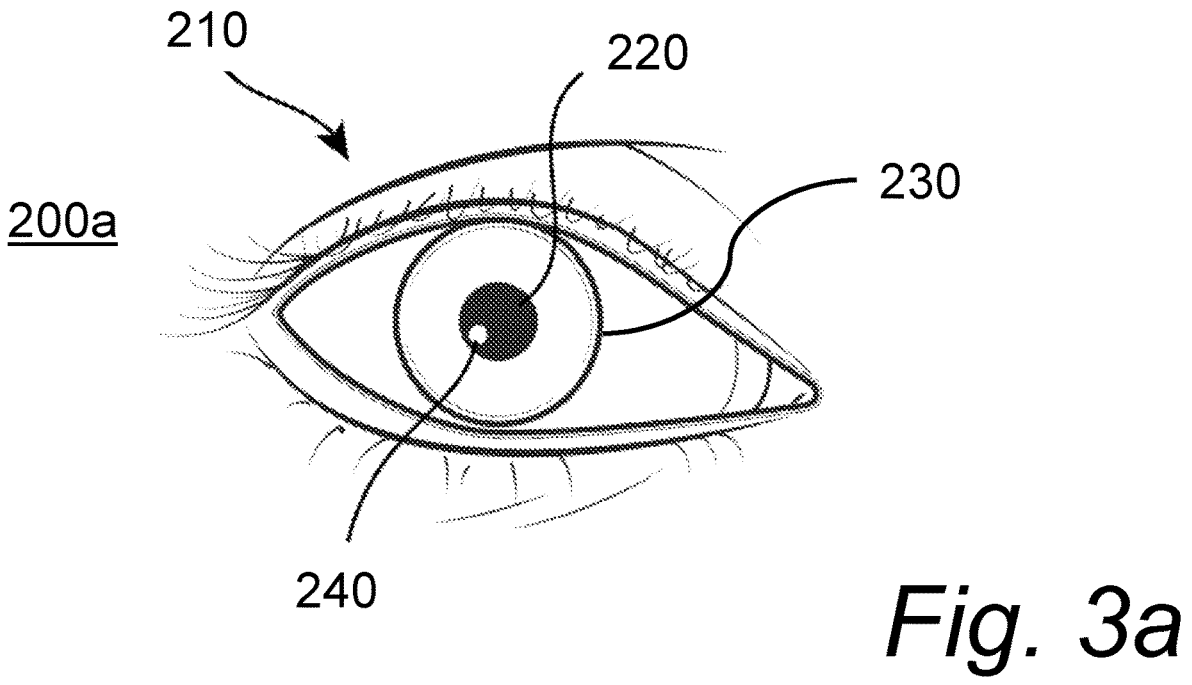
FIG. 3a shows a first example image of an eye.

FIG. 3a shows a first example image 200a of an eye 210. The image 200a of the eye 210 shows a pupil 220, an iris 230, and a glint 240 caused by reflection of light from an illuminator 120. The image processing module 150 may receive the image 200a from the image sensor 130 and employ image processing (such as digital image processing) to extract features from the image 200a. The image processing module 150 may employ pupil centre cornea reflection (PCCR) eye tracking to determine where the eye 210 is looking. In PCCR eye tracking, the position of the centre of the pupil 220 and the position of the centre of the glint 240 are estimated in the image processing module 150. The image processing module 150 calculates where the three dimensional position of the user's eye, for example relative to a known point, using the glint 240. The image processing module 150 also calculates the gaze direction of the user's eye 210 using the pupil 220. The gaze directions obtained from the left and right eyes may then be combined to form a combined estimated gaze direction (or viewing direction).

Figure 3B:
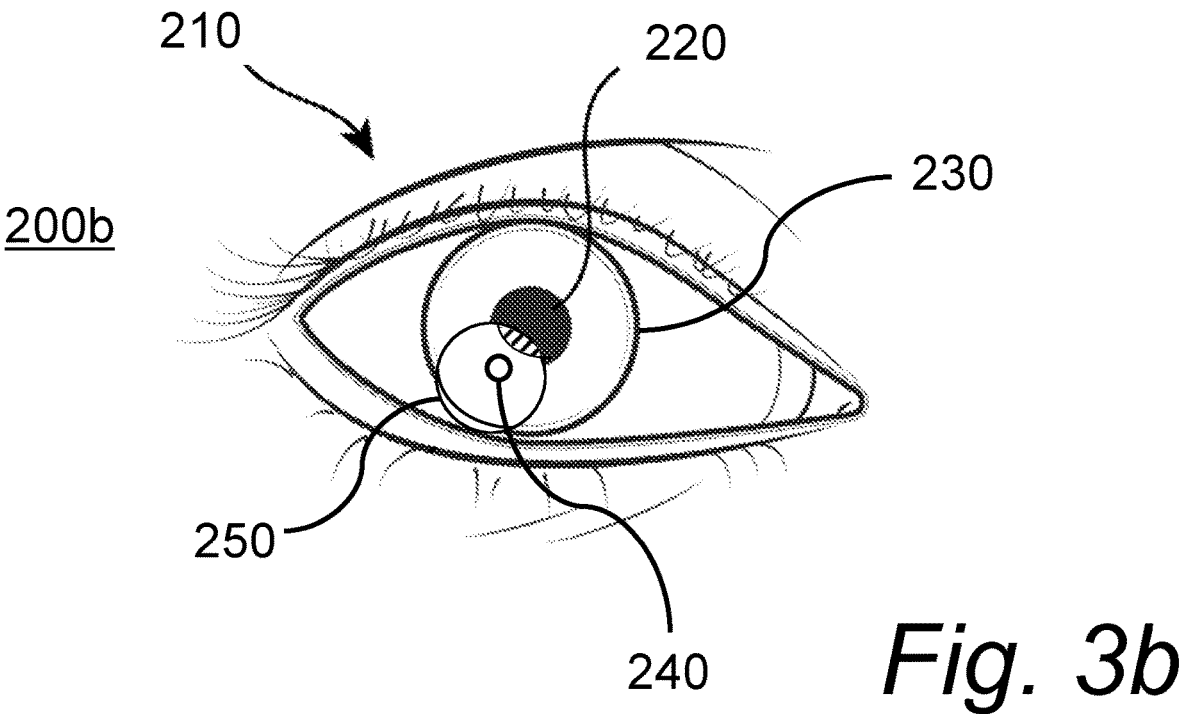
FIG. 3b shows a second example image of an eye, with a tear present.

FIG. 3b shows a second example image 200b of an eye 210. In this case, a tear 250, shown schematically as a circle, is present in the eye 210. It can be seen that the presence of the tear 250 has altered the perception of the pupil 220 and the iris 230, and altered the position of the glint 240 in the image 200b. This is due to the shape of the tear 250 and the water from which the tear 250 is made. The rounded shape of the tear 250 reflects light in a different way to the cornea of the eye 210, while the water in the tear 250 refracts light, further changing its direction. This means that the image processing discussed above cannot be performed in a reliable manner to determine a gaze direction.

Figure 3C:
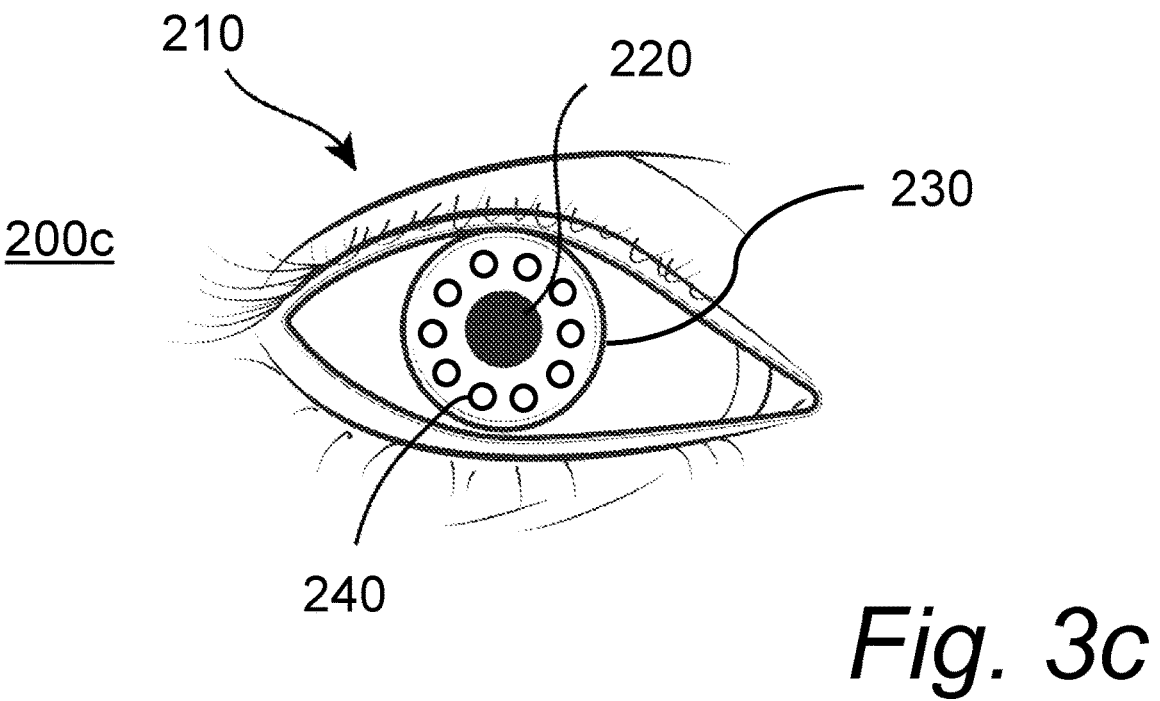
FIG. 3c shows a third example image of an eye.

FIG. 3c shows a third example image 200c of an eye 210. In this case, the image 200c of the eye 210 shows a pupil 220, an iris 230 and a plurality of glints 240 caused by reflection of light from a plurality of illuminators 120, for example the illuminators 120a-j shown in FIG. 2. The plurality of glints 240 form a glint pattern.

US 12,670,619 B2

7
8

Figure 3D:
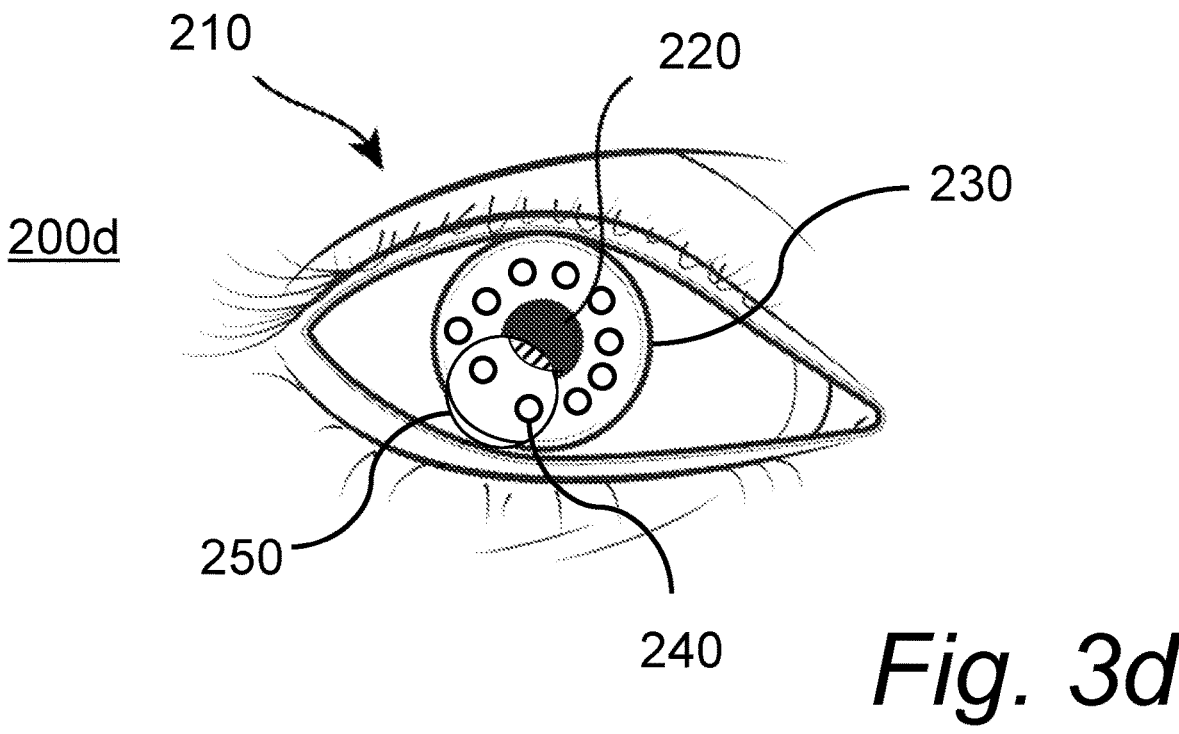
FIG. 3d shows a fourth example image of an eye, with a tear present.

FIG. 3*d* shows fourth example image 200*d* of an eye 210. In this case, a tear 250, shown schematically as a circle, is present in the eye 210. It can be seen that, in addition to altering the perception of the pupil 220 and the iris 230, the presence of the tear 250 has altered the glint pattern. Again, this means that the image processing discussed above cannot be performed in a reliable manner to determine a gaze direction.

To address these issues, a method is proposed for determining the presence of a tear 250 in an eye 210 of a user 170 of an eye tracking system 100. FIG. 4 shows an example method 300. The method 300 may be performed by an eye tracking system such as the system 100 shown in FIGS. 1 and 2.

At step 310, an eye 210 of the user 170 is illuminated. The illumination may be achieved using at least one illuminator 120 of the eye tracking system 100. As discussed above, the at least one illuminator 120 may be at a fixed position relative to the image sensor 130 and the display 140, for example at a workstation. In these embodiments, a position of the pupil 220 or iris 230 can be used to estimate a gaze direction of the eye 210. In some embodiments, the at least one illuminator 120 may be at a fixed position relative to the image sensor 130, the display 140, and the eye 210 of the user 170, for example in a head mountable device 160. In these embodiments, a position of the pupil 220 or iris 230 can be used to estimate a gaze direction of the eye 210 and a glint pattern can be used to determine a position of the eye 210. Alternatively or additionally, the illumination may be achieved using ambient light. The ambient light may be background light provided by a light source external to the system 100. It will be appreciated that any light source capable of ensuring the relevant parts of an eye 210 are visible in a captured image 200 could be used to illuminate the eye 210. In these embodiments, a position of the pupil 220 or iris 230 can be used to estimate a gaze direction of the eye 210.

At step 320, an image 200 of the eye 210 is captured. The image 200 is captured using an image sensor 130 of the eye tracking system 100. As discussed above, the image sensor 130 may be at a fixed position relative to the one or more illuminators 120 and the display 140, and in some embodiments relative to the eye 210 of the user 170.

At step 330, the image 200 is received by the image processing module 150. As discussed above, the image processing module 150 may be connected to the image sensor 130 via a wired or a wireless connection to receive the image 200 from the image sensor 130.

At step 340, the image 200 is processed by the image processing module 150 to identify one or more features of the image 200. The one or more features of the image 200 may comprise a centre of the pupil 220, an edge of the pupil 220, an edge of the iris 230, or a glint pattern comprising one or more glints 240.

In some examples, characteristics of these features are also determined. For example, the image 200 may be processed to determine a circularity of the edge of the pupil 220 or iris 230. This may be achieved using any suitable roundness or circularity algorithm known in the art. A common definition used in digital image processing is:

$$Circularity = \frac{Perimeter^2}{4\pi \times Area}$$ (1)

This circularity will be 1 for a circle and greater than 1 for non-circular shapes. Alternatively, the inverse could be used, in which the circularity will be 1 for a circle and approaches 0 for non-circular shapes. It will be appreciated that other measures of circularity may also be used.

In some examples, the image 200 may be processed to determine a position of at least one glint 240 of a glint pattern. This can be performed using methods known in the art for estimating the position of a glint 240.

In some examples, the image 200 may be provided to an image recognition algorithm. The image recognition algorithm may be trained to identify images of eyes with particular features present. The image recognition algorithm may be a machine-learning algorithm, for example an image classification algorithm, an object detection algorithm or an object segmentation algorithm, or the like. A machine-learning algorithm may be implemented using one or more neural networks.

At step 350, the one or more identified features is compared to one or more expected features. The comparison may be performed by the image processing module 150.

In one example, the determined circularity of the edge of the pupil 220 or iris 230 is compared to an expected circularity. The expected circularity may be determined from historical data of pupils 220 or irises 230 of a plurality of users 170, for example as an average value for the plurality of users 170, or may be an expected circularity of the pupil 220 or iris 230 of the specific user 170 of the system 100. In some embodiments, the expected circularity may correspond to a perfect circle. However, as the user 170 can look around relative to the image sensor 130, the edge of the pupil 220 or iris 230 will likely not be a perfect circle. In some embodiments, this can be taken into account by setting the expected circularity to a value other than that for a perfect circle. This can be done, for example, by determining a position of the pupil 220 and altering the expected circularity accordingly. In other embodiments, this can be taken into account by transforming the detected pupil 220 or iris 230 (or indeed the entire image 200) to a straight-on position once the position and gaze direction of the eye 210 are known, such that a circularity closer to that of a circle can be used for the comparison.

In another example, a distance may be determined between the determined position of at least one glint 240 and an expected position of the glint 240. In some embodiments, the position of a single glint 240 can be compared to its expected position. In some embodiments, the position of each glint 240 in a glint pattern may be compared to a respective expected position.

In the case that the image 200 is provided to an image recognition algorithm that is trained to identify images of eyes with particular features present, the image recognition algorithm may compare the image 200 to other images that have been labelled in a certain way, and determine if they have similar composition, for example if the images include similar parts or features.

At step 360, the image processing module 150 determines whether a tear 250 is present in the eye of the user. In particular, it is determined that a tear 250 is present in the eye of the user based on the comparison.

In one example, the difference between the determined circularity of the edge of the pupil 220 or iris 230 and the expected circularity is compared to a threshold. If the difference is above the threshold, it can be determined that the image 200 of the eye 210 is distorted by the presence of the tear 250 (for example, as shown in images 200*b* and 200*d* in FIGS. 3*b* and 3*d*, respectively). For example, if a circularity of the eye 210 is determined using equation (1) to be 1.5, the expected circularity is 1.0, and a threshold is set at 0.3, it will be determined that a tear 250 is present in the eye 210. In a similar case, but where the circularity of the eye 210 is determined using equation (1) to be 1.2, it will be determined that no tear 250 is present in the eye 210.

In another example, the distance between the determined position of a glint 240 and an expected position of the glint 240 is compared to a threshold. If the difference is above the threshold, it can be determined that the image 200 of the eye 210 is distorted by the presence of the tear 250 (for example, as shown in images 200b and 200d in FIGS. 3b and 3d, respectively). For example, if the distance is determined to be 1 mm, and the threshold is set at 0.5 mm, it will be determined that a tear 250 is present in the eye 210. In a similar case, but where the distance is determined to be 0.3 mm, it will be determined that no tear 250 is present in the eye 210.

The distance used to compare glint positions can be the distance between the position of a single glint 240 and its expected position. However, in some cases, the position of a single glint 240 may differ from its expected position for a number of reasons other than the presence of a tear 250. It may therefore be advantageous to take other information into account. For example, another estimate of the cornea position and/or information from previous frames can be used to determine if the glint 230 has moved, for example, due to natural movement of the eye.

It may also be advantageous to take further glints 240 into account. For example, the implementation of FIG. 2 will produce up to ten glints 240 (in certain instances, some of the illuminators 120 may not produce glints 240 as the eye 210 is looking in a particular direction that prevents them from doing so). In this case, the distance between each glint 240 and its expected position may be considered. For example, each distance may be taken individually, and if a certain number of these are above a distance threshold, then it will be determined that a tear 250 is present in the eye 210. Following the example above, if the threshold is set at 0.5 mm, and five or more of the ten glints are further than 0.5 mm from their expected position, it may be determined that a tear 250 is present in the eye 210. Alternatively, only the smallest distance value or the largest distance value may be compared to a threshold. In another example, an average of the distance values may be determined and compared to a threshold. It will be appreciated that a subset of a total number of glints 240 could be selected for the determination. In one example, it could be determined whether one or more glints 240 in the lower part of the detected glint pattern have a consistent offset relative to the expected pattern. It will be appreciated that any suitable number of glints 240 and any suitable threshold could be used to determine the presence of a tear 250.

In the case that the image 200 is provided to an image recognition algorithm trained to identify images of eyes with particular features present, if the captured image 200 is determined to have a similar composition to images that have been labelled as including a tear, it will be determined that a tear 250 is present in the eye 210. If the captured image 200 is determined to have a similar composition to images that have been labelled as not including a tear, it will be determined that no tear 250 is present in the eye 210.

If a tear 250 is detected, at step 370, the image processing module 150 takes an associated action. For example, an alert may be generated to the user 170 that a tear 250 is present in the eye 210. The alert may be a visual alert, for example shown on the display 140, an audio alert, or a tactile or haptic alert, for example provided through a wearable device 160 or a user input device associated with the system 100, such as a mouse or a trackpad. The user 170 may then take action to remove the tear 250, which will ensure that the eye tracking can be performed reliably. In another example, a confidence value for an output of the eye tracking system 100 may be generated based on the presence of the tear 250. For example, it may be indicated that the eye tracking that is performed by the eye tracking system 100 is unreliable due to the presence of the tear 250. This may be provided as a visual, audio or tactile/haptic indication, as discussed above. In this way, the user in informed that the output of the eye tracking system 100 should be used with caution. In another example, an eye tracking algorithm may be altered to take account of the tear 250. For example, the image processing that is performed to determine a gaze direction may be altered to determine a gaze direction based on the presence of the tear 250. The algorithm may be altered to discard the area of the image 200 in which the tear 250 is present, or the image processing can be adapted to use the information from the tear 250 to produce a more accurate output. For example, the depth of the tear 250 may be determined and ray tracing may be used to determine the real glint position and pupil edge based on the refractive index of the tear 250.

If no tear 250 is detected at step 360, the method 300 may proceed directly to step 380, where eye tracking is performed using any suitable eye tracking process known in the art. After the performance of an action at step 370, the method 300 may also proceed to step 380. In this case, the eye tracking may be performed using any suitable eye tracking process, but the user is alerted that a tear 250 is present, or has been informed that the eye tracking output may not be reliable. Alternatively, the eye tracking is performed with an algorithm that is specifically configured to take the tear 250 into account.

Steps 330 to 380 of the method may each be performed at the image processing module 150 of the eye tracking system 100. This can be considered as a sub-method 400 performed by an image processing module 150 that is integrated with the system 100, for example in a head-mountable deice 160, or an image processing module 150 that is located remotely from other components of the system 100.

The methods disclosed above solve the problems in the prior art by determining if a tear is present in the eye of a user of an eye tracking system. Once a tear is detected, an appropriate action can be taken. For example, an alert that a tear is present in the eye can be generated, which enables the user to take action to remove the tear. A confidence value for an output of the eye tracking system based on the presence of the tear can also be provided to a user. This means that the user in informed that the output should be used with caution. In some examples, an eye tracking algorithm can be altered to take account of the tear, for example by removing the tear from consideration by the algorithm or by altering the algorithm itself to take the tear into account.

Figure 5:
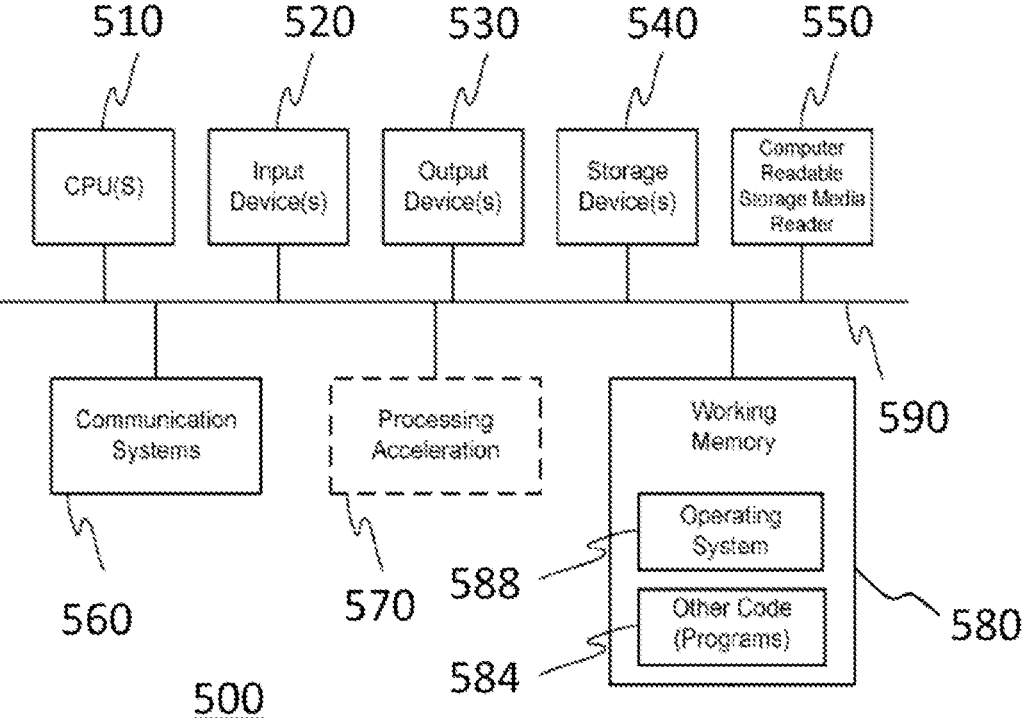
FIG. 5 is a block diagram of an exemplary computer system capable of being used in at least some portion of the devices or systems of the present disclosure, or implementing at least some portion of the methods of the present disclosure.

FIG. 5 is a block diagram illustrating an exemplary computer system 500 in which embodiments of the present disclosure may be implemented. This example illustrates a computer system 500 such as may be used, in whole, in part, or with various modifications, to provide the functions of the disclosed methods and systems. For example, various functions may be controlled by the computer system 500, including, merely by way of example, generating, processing, comparing, determining, receiving, etc. The computing system may be one embodiment of the image processing module 150.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage devices 540. By way of example, the storage devices 540 may be disk drives, optical storage devices, solid-state storage device such as a random-access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infrared communication device, Bluetooth™ device, cellular communication device, etc.), and a working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with the storage devices 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within the working memory 580, including an operating system 588 and/or other code 584. It should be appreciated that alternative embodiments of a computer system 500 may have numerous variations from that described above. For example, customised hardware might also be used and/or particular elements might be implemented in hardware, software (including portable software, such as applets), or both. Furthermore, connection to other computing devices such as network input/output and data acquisition devices may also occur.

Software of the computer system 500 may include code 584 for implementing any or all of the function of the various elements of the architecture as described herein. For example, software, stored on and/or executed by a computer system such as the system 500, can provide the functions of the disclosed system. Methods implementable by software on some of these components have been discussed above in more detail.

The invention claimed is:

1. A method of determining a presence of a tear in an eye of a user of an eye tracking system, the method comprising:
   receiving an image of the eye of the user;
   processing the image to identify one or more features of the image, wherein the one or more features comprises an edge of the pupil or iris of the eye of the user;
   processing the image to determine a circularity of the edge of the pupil or iris;
   comparing the one or more identified features to one or more expected features, wherein the one or more expected features are based on a known spatial relationship between at least one component of the eye tracking system and the eye of the user, and wherein comparing comprises comparing the determined circularity to an expected circularity;

determining that a tear is present in the eye of the user based on the comparison, wherein the determination that a tear is present is made if a difference between the determined circularity and the expected circularity is above a threshold; and
   altering an eye tracking algorithm to take account of the tear by discarding image data associated with the tear; or
   altering an eye tracking algorithm to take account of the tear by applying a correction factor to account for optical distortion caused by the tear.

2. The method of claim 1, wherein the one or more features of the image comprises an edge of the pupil or iris of the eye of the user.

3. The method of claim 1, wherein the one or more features of the image comprises a glint pattern comprising one or more glints, the method comprising:
   processing the image to determine a position of at least one glint of the glint pattern;
   determining a distance between the determined position of at least one glint and an expected position of the at least one glint; and
   determining that a tear is present in the eye of the user if the determined distance is above a threshold.

4. The method of claim 1, comprising providing the image to an image recognition algorithm, wherein the image recognition algorithm is trained to identify images of eyes with a tear present.

5. The method of claim 1, further comprising one of:
   generating an alert that a tear is present in the eye of the user;
   generating a confidence value for an output of the eye tracking system based on the presence of the tear.

6. An eye tracking system for determining a presence of a tear in an eye of a user, the system comprising:
   an image sensor configured to capture an image of the eye of the user; and
   an image processing module configured to:
      process the captured image to identify one or more features of the image, wherein the one or more features comprises an edge of the pupil or iris of the eye of the user;
      process the captured image to determine a circularity of the edge of the pupil or iris;
      compare the one or more identified features to one or more expected features, wherein the one or more expected features are based on a known spatial relationship between at least one component of the eye tracking system and the eye of the user, and wherein comparing comprises comparing the determined circularity to an expected circularity; and
      determine that a tear is present in the eye of the user based on the comparison, wherein the determination that a tear is present is made if a difference between the determined circularity and the expected circularity is above a threshold; and
   altering an eye tracking algorithm to take account of the tear by discarding image data associated with the tear; or
   altering an eye tracking algorithm to take account of the tear by applying a correction factor to account for optical distortion caused by the tear.

7. The eye tracking system of claim 6, wherein the one or more features of the image comprises a glint pattern comprising one or more glints, wherein the image processing module is configured to:

US 12,670,619 B2

13 process the captured image to determine a position of at
least one glint of the glint pattern;
determine a distance between the determined position of
at least one glint and an expected position of the at least
one glint; and
determine that a tear is present in the eye of the user if the
determined distance is above a threshold.

8. The eye tracking system of claim 6, wherein the image
processing module is configured to provide the captured
image to an image recognition algorithm, wherein the image
recognition algorithm is trained to identify images of eyes
with a tear present.

9. The eye tracking system of claim 6, wherein the image
processing module is configured to perform at least one of:
generating an alert that a tear is present in the eye of the
user;
generating a confidence value for an eye tracking result
based on the presence of the tear.

10. The eye tracking system of claim 6, further compris-
ing at least one illuminator configured to illuminate the eye
of the user of the eye tracking system, wherein the illumi-
nator is arranged at a fixed position relative to the image
sensor and/or the eye of the user.

11. A head-mountable device comprising:
at least one illuminator configured to illuminate an eye of
the user;
an image sensor configured to capture an image of the eye
of the user; and

14 an image processing module configured to:
process the captured image to identify one or more
features of the image, wherein the one or more
features comprises an edge of the pupil or iris of the
eye of the user;
process the captured image to determine a circularity of
the edge of the pupil or iris;
compare the one or more identified features to one or
more expected features, wherein the one or more
expected features are based on a known spatial
relationship between the at least one illuminator, the
image sensor, and the eye of the user, and wherein
comparing comprises comparing the determined cir-
cularity to an expected circularity; and
determine that a tear is present in the eye of the user
based on the comparison, wherein the determination
that a tear is present is made if a difference between
the determined circularity and the expected circular-
ity is above a threshold; and
altering an eye tracking algorithm to take account of the
tear by discarding image data associated with the tear;
or
altering an eye tracking algorithm to take account of the
tear by applying a correction factor to account for
optical distortion caused by the tear.

* * * * *